US008385386B2

(12) United States Patent
Mantravadi et al.

(10) Patent No.: US 8,385,386 B2
(45) Date of Patent: *Feb. 26, 2013

(54) METHOD FOR TRANSMITTING MULTIPLE STREAMS IN WIRELESS BROADCAST NETWORKS

(75) Inventors: Ashok Mantravadi, San Diego, CA (US); Anand D. Subramaniam, late of, San Diego, CA (US); Krishnamurthy Viswanarhan, legal representative, La Jolla, CA (US); Dhananjay A. Gore, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 170 days.

This patent is subject to a terminal disclaimer.

(21) Appl. No.: 12/782,406

(22) Filed: May 18, 2010

(65) Prior Publication Data
US 2010/0226303 A1 Sep. 9, 2010

Related U.S. Application Data

(63) Continuation of application No. 11/046,121, filed on Jan. 28, 2005, now Pat. No. 7,787,517.

(60) Provisional application No. 60/540,310, filed on Jan. 28, 2004.

(51) Int. Cl.
*H04B 1/00* (2006.01)

(52) U.S. Cl. ........ 375/146; 375/260; 375/395; 370/344; 370/437; 455/91; 455/450

(58) Field of Classification Search .................. 375/140, 375/141, 146, 260, 267, 295, 299; 370/203, 370/204, 319, 321, 331, 344, 437, 441, 442, 370/464, 465, 480; 455/91, 101, 103, 509, 455/436, 442, 443, 450
See application file for complete search history.

(56) References Cited

U.S. PATENT DOCUMENTS

| 5,892,879 A | 4/1999 | Oshima |
| 6,038,450 A | 3/2000 | Brink et al. |

(Continued)

FOREIGN PATENT DOCUMENTS

| EP | 1041756 | 3/2000 |
| EP | 1170882 | 7/2001 |

(Continued)

OTHER PUBLICATIONS

International Preliminary Report on Patentability PCT/US05/002677, IPEA/US Oct. 11, 2006.

(Continued)

*Primary Examiner* — Dac Ha
(74) *Attorney, Agent, or Firm* — Arent Fox, LLP

(57) ABSTRACT

Accordingly, a method and apparatus are provided to convert received content into a first stream and a second stream, to transmit said first stream using a first tone and to transmit said second stream using an orthogonal scheme. A layering scheme is used to transmit the base stream covering a smaller area and an enhanced stream is used to cover a large utilizing orthogonal scheme.

31 Claims, 4 Drawing Sheets

U.S. PATENT DOCUMENTS

| | | |
|---|---|---|
| 6,256,508 B1 | 7/2001 | Nakagawa et al. |
| 6,917,580 B2 | 7/2005 | Wang et al. |
| 6,944,142 B2 | 9/2005 | Grieco |
| 7,787,517 B2 | 8/2010 | Mantravadi et al. |
| 2001/0012322 A1 | 8/2001 | Yoshitomi et al. |
| 2001/0123322 | 8/2001 | Nagaoka et al. |
| 2001/0019582 A1 | 9/2001 | Kaku et al. |
| 2002/0114270 A1 | 8/2002 | Pierzga et al. |
| 2003/0078061 A1 | 4/2003 | Kim |
| 2003/0129982 A1 | 7/2003 | Perini |
| 2004/0014482 A1 | 1/2004 | Kwak et al. |
| 2004/0131011 A1 | 7/2004 | Sandell et al. |
| 2005/0058151 A1* | 3/2005 | Yeh .............. 370/445 |
| 2005/0254649 A1 | 11/2005 | Demos |
| 2006/0198454 A1 | 9/2006 | Chung et al. |
| 2007/0230914 A1 | 10/2007 | Garrido et al. |
| 2008/0170528 A1 | 7/2008 | Bosch et al. |

FOREIGN PATENT DOCUMENTS

| | | |
|---|---|---|
| JP | 2005524333 | 8/2005 |
| KR | 20030086172 | 11/2003 |
| WO | 0165848 | 9/2001 |
| WO | 03009578 | 1/2003 |

OTHER PUBLICATIONS

Written Opinion PCT/US05/002677, International Search Authority European Patent Office, Jul. 25, 2006.

International Search Report PCT/US05/002677, International Search Authority European Patent Office, Aug. 11, 2005.

* cited by examiner

METHOD FOR TRANSMITTING MULTIPLE STREAMS IN WIRELESS BROADCAST NETWORKS

CLAIM OF PRIORITY UNDER 35 U.S.C. §119

The present application for patent claims priority to Provisional Application No. 60/540,310 entitled "HIERARCHICAL CODING IN A MULTI-FREQUENCY BROADCAST NETWORK" filed Jan. 28, 2004, and assigned to the assignee hereof and hereby expressly incorporated by reference herein.

FIELD OF INVENTION

The present invention relates generally to a broadcast system, more particularly, to a broadcast of content from transmitters from different geographical areas.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems.

The wireless communication system further employs a broadcast system, wherein portion of the forward link resources are dedicated for broadcasting content. In the broadcast system, all the recipients process data received on the dedicated channel on the forward link (i.e., frequency tones that make up a shared channel), as if the information was targeted for the recipient. A typical broadcast system does not require any acknowledgement from the recipients regarding the reception of data. However, operators of the system, generally configure the AP (or access points) to use low data rate (e.g., repeat the transmission data packets that make up the content) and at high power in order to insure that all the mobile stations within the base station's coverage area receive the content, including any mobile stations that are far from the base station. However, low data rates are generally needed only for mobile stations that operate far from the currently servicing base station. Thus, all the mobile stations that operate near the base station cannot enjoy higher data rates.

Therefore, a method is needed to manage the broadcast resources to reduce the coverage hole.

BRIEF SUMMARY OF THE INVENTION

Accordingly, a method and apparatus are provided to convert received content into a first stream and a second stream, to transmit said first stream using a first set of tones and to transmit said second stream using an orthogonal scheme. A more complete appreciation of all the advantages and scope of the invention can be obtained from the accompanying drawings, the description and the appended claims.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs. The word "listening" is used herein to mean that a terminal is receiving and processing data received on a given channel.

Figure 1:
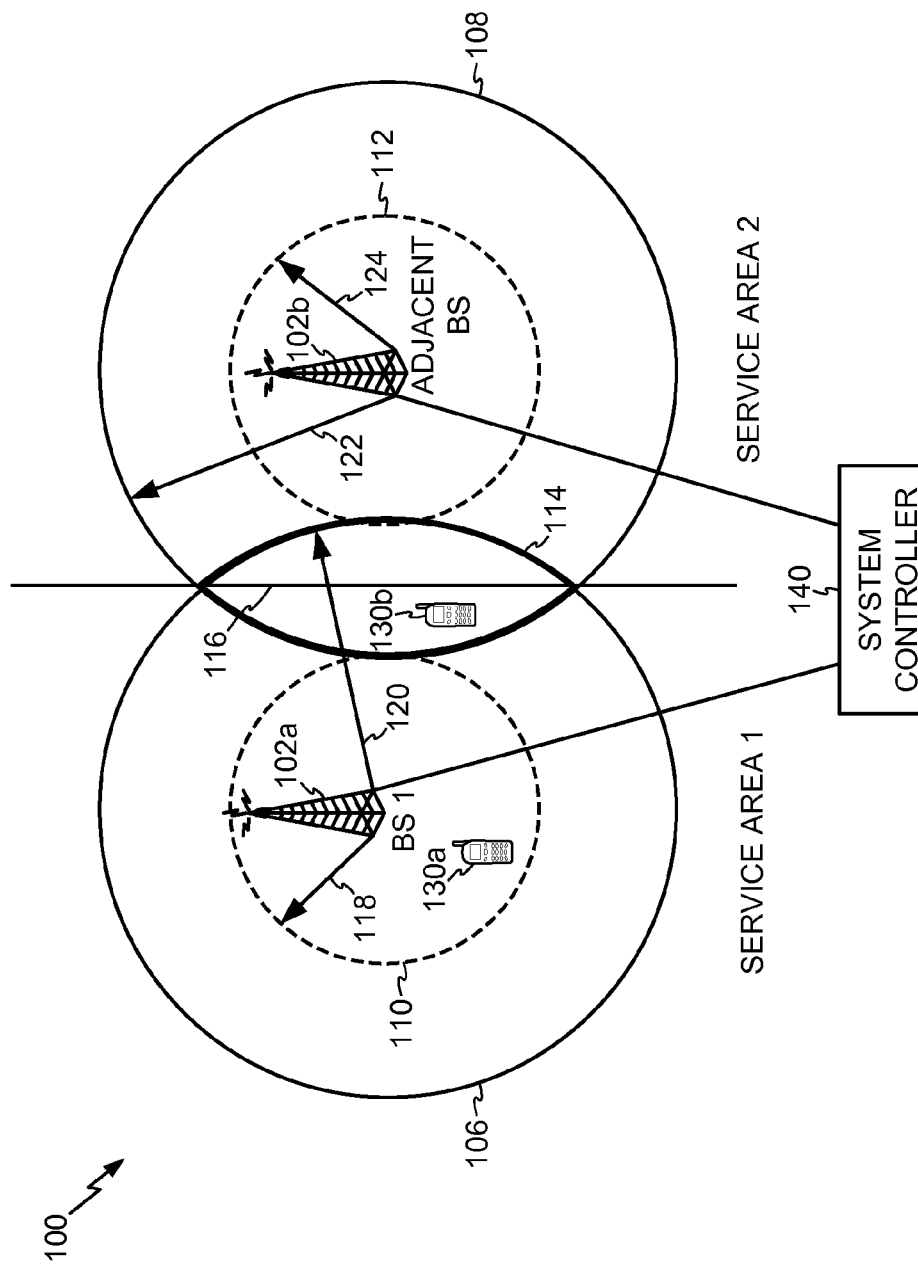
FIG. 1 shows a diagram of a wireless multiple-access communication system.

FIG. 1 shows a diagram of a wireless multiple-access communication system 100 that employs multi-carrier modulation. System 100 as shown includes access points, for example 102a and 102b that communicate with a number of access terminals 130a-130b. For simplicity, only two access points 102a and 102b and only two access terminals 130a-130b are shown in FIG. 1. For purpose of discussion, when referring to a single access terminal (AT) 130x is used and when referring to a single access point (AP) 102x will be used. Components of access terminal 130x and access point 102x are described in FIG. 2, below.

For illustration, AP 102a services service area 1 and AP 102b services service area 2. The AP 102a has service coverage defined by 106 having a radius vector 120 and the AP 102b has service coverage defined by 108 having a radius vector 122. As discussed below, area 106 and 108 are serviced using the base streams for broadcast system. Note that 106 and 108 assumes that interference does not exit. Once the APs 102a and 102b are placed adjacent to each other as shown in FIG. 1, the service area is reduced and defined as coverage hole 116. Also, AP 102a and 102b further defines a service area 110 and 112, respectively, and area serviced using a layered scheme (e.g. use of both enhanced stream and base stream), discussed below.

As discussed above, a coverage hole 116 is shown for illustrating the area where signals from AP 102a and AP 102b interfere with each other. For illustration, the coverage hole boundary 114 is shown which defines the coverage hole 106. As shown in FIG. 1, the AT 130b, operating within coverage hole boundary 114 would not be able to receive the content.

An access point 102x, is an electronic device configured to communicate with one or more user access terminals and may also be referred to as a base station, base terminal, fixed terminal, a fixed station, base station controller, a controller, transmitter or some other terminology. The access point, base terminal, and base station are interchangeably used in the description below. The access point 102x may be a general purpose computer, a standard laptop, a fixed terminal, an electronic device configured to transmit, receive and process data according to air interface methods defined by an OFDMA, CDMA, GSM, WCDMA, etc., or an electronic module comprising one or more computer chips controlled by a controller or a processor for transmitting, receiving and processing data according to air interface methods defined by an OFDMA, CDMA, GSM, WCDMA, etc.

An AT 130x, is an electronic device configured to communicate with the access point via a communication link. The AT 130x may also be referred to as a terminal, a user terminal, a remote station, a mobile station, a wireless communication device, recipient terminal, or some other terminology. The AT 130x, mobile terminal, user terminal, terminal are interchangeably used in the description below. Each AT 130x may communicate with one or multiple access points on the downlink and/or uplink at any given moment. The downlink (i.e., forward link) refers to transmission from the access point to the AT 130x, and the uplink (i.e., reverse link) refers to transmission from the AT 130x to the access point. The AT 130x may be any standard laptop, personal electronic organizer or assistant, a mobile phone, cellular phone, an electronic device configured to transmit, receive and process data according to air interface methods defined by an OFDMA, CDMA, GSM, WCDMA, etc. system, or an electronic module comprising one or more computer chips controlled by a controller or a processor for transmitting, receiving and processing data according to air interface methods defined by an OFDMA, CDMA, GSM, WCDMA, etc. system.

A system controller 140 couples to the access points and may further couple to other systems/networks (e.g., a packet data network). System controller 140 provides coordination and control for the access points coupled to it. Via the access points, system controller 140 further controls the routing of data among the terminals, and between the terminals and other users coupled to the other systems/networks. The system controller 140 may be used to update the transmit information for the base and enhanced streams.

Figure 2:
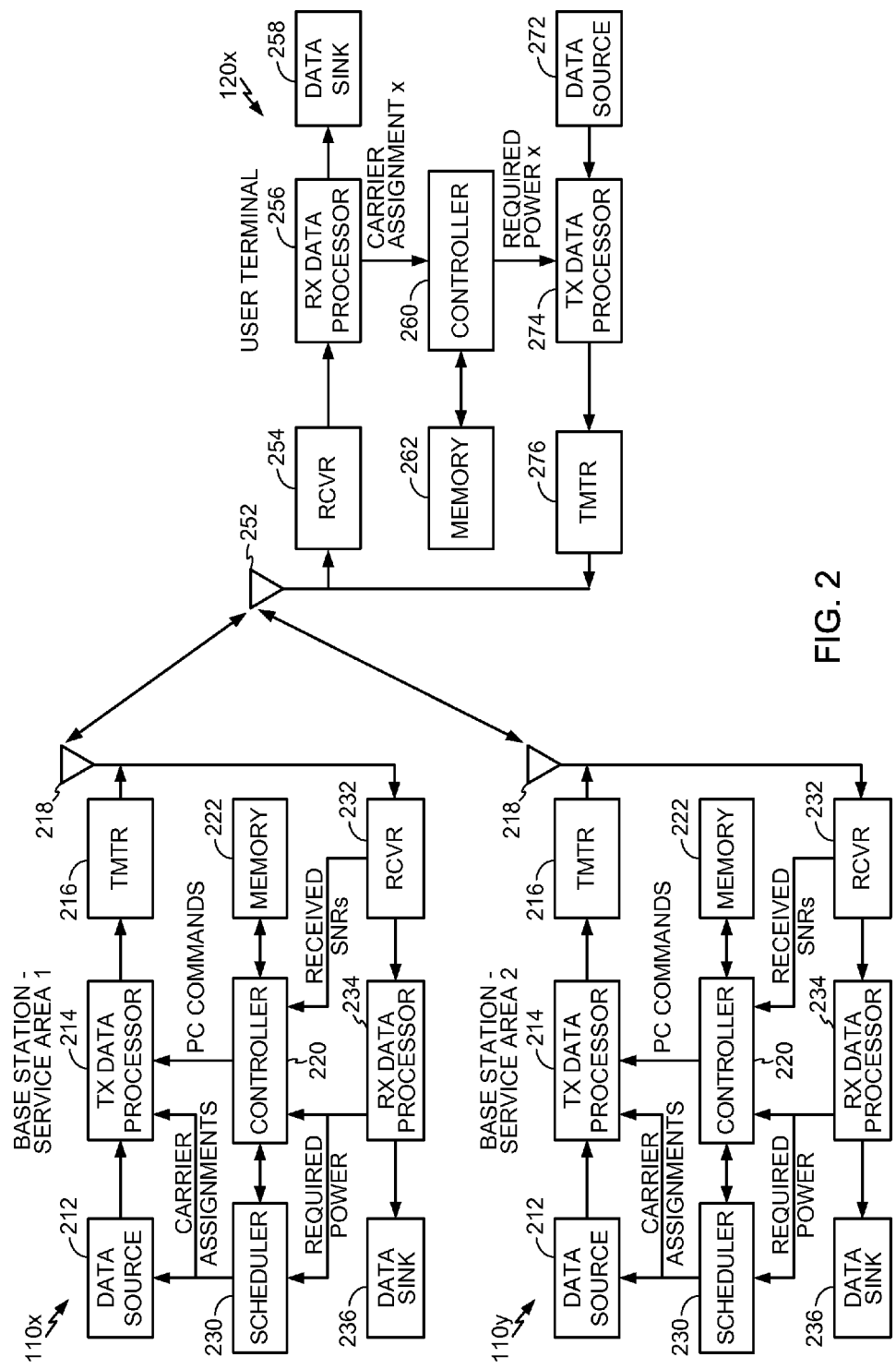
FIG. 2 a block diagram of a communication system.

FIG. 2 shows a block diagram of an embodiment of two access points 102x and 102y and a AT 130x in multiple-access multi-carrier communication system 200. At access point 102x, a transmit (TX) data processor 214 receives content data from a data source 212 and signaling and other information from a controller 220 and a scheduler 230. These various types of data may be sent on different transport or broadcast channels. TX data processor 214 encodes and modulates the received data using multi-carrier modulation (e.g., OFDM) to provide modulated data (e.g., OFDM symbols). For example, the controller 220 converts the content into two data streams, a base stream and an enhanced stream. The controller 220 modulates the stream based on pre-determined scheme. A transmitter unit (TMTR) 216 then processes the modulated data to generate a downlink modulated signal that is then transmitted from an antenna 218.

The terminal 130x receives the modulated signal via an antenna 252 and provides to a receiver unit (RCVR) 254. Receiver unit 254 processes and digitizes the received signal to provide samples. A received (RX) data processor 256 then demodulates and decodes the samples to provide decoded data, which may include recovered traffic data, messages, signaling, and so on. The traffic data may be provided to a data sink 258, and the carrier assignment sent for the terminal are provided to a controller 260.

Controller 260 processes the received data stream based on information provided by the AP 102x during registration process. For each active terminal 130, a TX data processor 274 receives traffic data from a data source 272 and signaling and other information from controller 260. The various types of data are coded and modulated by TX data processor 274 using the assigned carriers and further processed by a transmitter unit 276 to generate an uplink modulated signal that is then transmitted from antenna 252.

At access point 102x, the transmitted and modulated signals from the terminals are received by antenna 218, processed by a receiver unit 232, and demodulated and decoded by an RX data processor 234. Receiver unit 232 may estimate the received signal quality (e.g., the received signal-to-noise ratio (SNR)) for each terminal and provide this information to controller 220. Controller 220 may then derive the PC commands for each terminal such that the received signal quality for the terminal is maintained within an acceptable range. RX data processor 234 provides the recovered feedback information (e.g., the required transmit power) for each terminal to controller 220 and scheduler 230.

Figure 3:
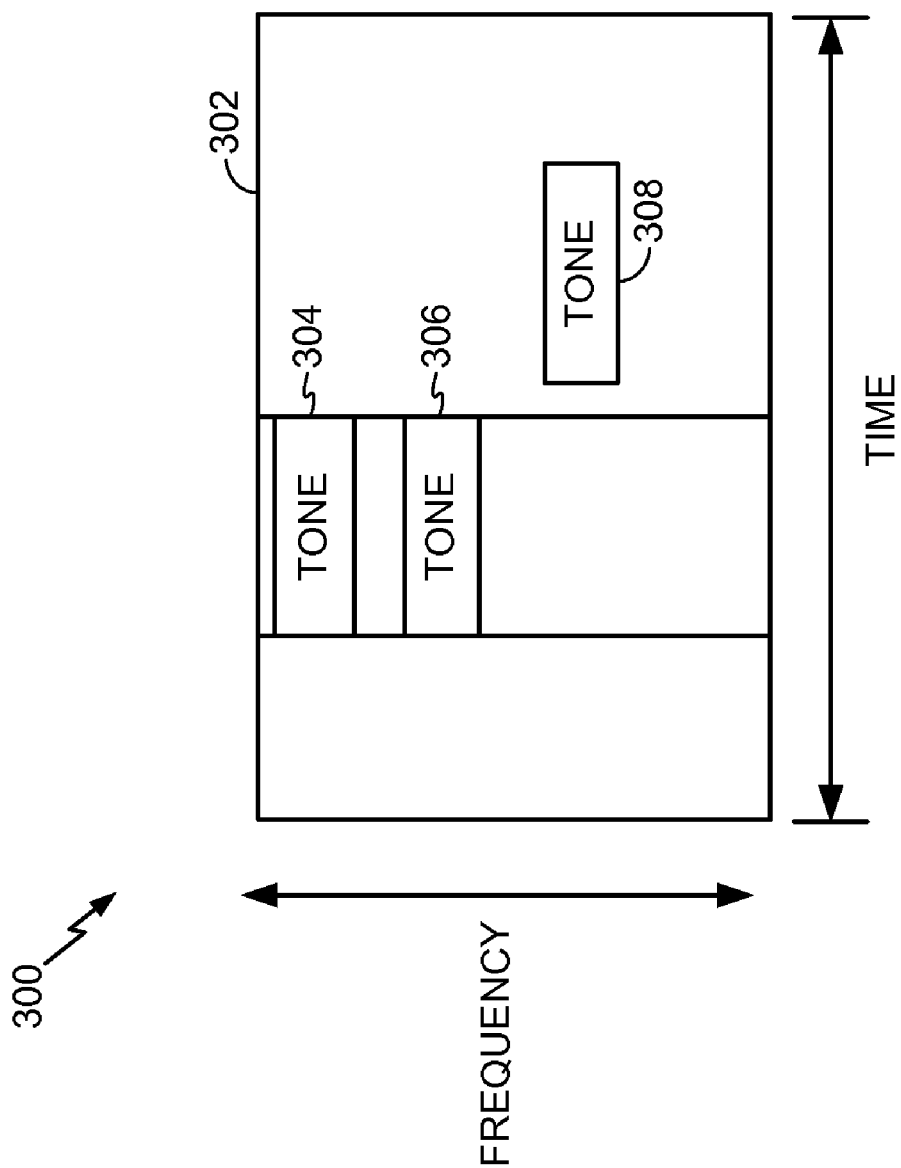
FIG. 3 shows an illustration of exemplary frame of a communication system.

For clarity, techniques described herein are described in reference to an OFDMA system that utilizes orthogonal frequency division multiplexing (OFDM). In this system, for forward link, several frames are used to transmit signaling information, content data, etc. FIG. 3 illustrates a frame 302 used in the OFDMA system. The frame is defined by frequency and time. With each frame, based on available resources, multiple tones, for example 304, 306 and 308, are defined for transmitting data. A tone comprises frequency value for duration of time. The frequency value is determined by the operator based on the available resources. As discussed in detail below, for transmitting streams using layered modulation, tone 304 may be used, wherein two streams may be layered, for transmitting the streams. Using the orthogonal scheme, wherein the tone 306 used by a first AP 102x and tone 308 is used by a second AP 102x. This will allow the AT 130b operating within the coverage hole to discard information received on tone 306 or 308, depending on service area associated with AT 130b. For example, if AT 130b is associated with service area 2 (serviced by second AP 102x), then AT 130b will ignore tone 306 transmitted by first AP 102x.

According to an embodiment, a layered modulation (also referred to as layered scheme) in a broadcast system is employed. Layered modulation consists of transmitting multiple streams together, with each stream targeted towards a subset of users with a certain minimum channel quality. Users with better channel quality (user near the AP 102x) will be able to decode more than one stream and hence achieve higher data rates. Since users well within the service area are likely to have better channels, the goal of layered modulation is to provide better throughput in the interior of the channel. Combining this with the trade-off provided with re-use, the basic idea behind our proposal can be summarized as: use different re-use techniques for different streams in a system with layered modulation.

For simplicity, the OFDM broadcast system is used for illustration. Note that the methods described herein may be employed using any other system that provides broadcast capabilities and orthogonalization capabilities across transmitters. Furthermore, only one AP 102x is used for a service area and two service areas used for illustration purposes, as shown in FIG. 1 above. Also, the broadcast is done using OFDM and re-use is achieved by allocating disjoint sets of tones to each AP 102x. The number of tones in each set is equal. It is assumed that the signal from each AP 102x goes through an additive white Guassian noise (AWGN) channel and the layered modulation comprises of sending two streams, a base stream targeted towards all users in the service areas and an enhancement stream targeted towards users with better signal-to-noise ratio (SNR).

Assume the OFDM scheme comprises of using 2N data tones. These 2N tones are divided into two disjoint sets, $N_{b1}$ and $N_{b2}$, each with N tones. At the first AP 102x, the transmitted symbols at the different tones are given by $$s_1(k) = \sqrt{P_{b,1}}\, x_{b,1}(k) + \sqrt{P_{e,1}}\, x_{e,1}(k), \quad k \in N_{b,1}$$
$$= \sqrt{P_{e,1}}\, x_{e,1}(k), \qquad k \in N_{b,2}$$

where $x_{e1}$ and $x_{e1}$ are the symbols from the base and enhancement streams (i.e., Layered scheme), with powers $P_{b1}$ and $P_{e1}$ respectively. In other words, both base and enhancement streams are sent on $N_{b1}$ tones, while only the enhancement stream is sent on the remaining $N_{b2}$ tones. Note that the power allocated to the base stream is typically larger than that for the enhancement stream must satisfy the overall constraint:

$$NP_{b1} + 2NP_{e1} = \text{const.} \qquad \text{Equation 1}$$

The symbol from the second service area can be written in a similar manner, with the base streams transmitted on the $N_{b2}$ tones and the enhancement stream transmitted on all tones.

Consider now the received symbol at the tone k at any point in Service area 1.

$$y(k) = s_1(k) + \beta s_2(k) + n(k)$$

where β represents the strength of the signal from the second AP 102x relative to that from the first AP 102x, n(k is Guassian noise with variation $\sigma^2$, and the parameters β & $\sigma^2$ depend on the location in the coverage area. Thus, for the set of tones in $N_{b1}$, the receiver sees interference from the enhancement streams from both service areas, but none from the base stream 2. The decoding of the base stream treats the two enhancement streams as additive interference. Once the base stream is decoded, it is subtracted from the received symbols, so that the enhancement stream 1, sees interference from the enhancement stream 2 on all tones. In addition, for the tones in $N_{b2}$, interference is seen from base stream 2 as well. The decoding of the enhancement stream treats these as additive interference. It may seem that interference from base stream 2 would severely degrade performance of the enhancement stream 1, but the key is that enhancement stream 1 is expected to be decoded only in the interior points and hence base stream 2 would be significantly attenuated.

We can characterize the performance of the above scheme in terms of theoretical spectral efficiency based on the Shannon capacity of and AWGN channel. The rate for the base stream is determined by worst case where signal-to-interference-plus-noise (SINR) in Service area 1, where SINR includes interference from the two enhancement streams. Let P denote such a point at the edge of coverage, with noise variance $\sigma_p^2$ and interference attenuation $\beta_p$. The spectral efficiency for the base stream is given by $$R_{b,1} = \frac{1}{2}\log\left(1 + \frac{P_{b,1}}{\sigma_p^2 + P_{e,1} + \beta_p P_{e,2}}\right)\text{ bps/Hz} \qquad \text{Equation 2}$$

where the factor of ½ arises because we are using only half the tones.

Similarly, the rate for the enhancement stream is governed by the worst case SINR in a smaller coverage area, where the SINR includes base stream 2 and enhancement stream 2. Let $\sigma_q^2$ and $\beta_q$ be the noise variance for a point at the edge of coverage for the enhancement stream. Note that, since this coverage area is smaller than that for the base stream, we have $\beta_q < \beta_p$ and $\sigma_q^2 < \sigma_p^2$. Hence the overall interference is lesser at point q, and the base stream is decodable at q. The rate of the enhanced stream at point q is given by $$R_{e,1} = \frac{1}{2}\log\left(1 + \frac{P_{e,1}}{\sigma_q^2 + \beta_q P_{e,2}}\right) + \qquad \text{Equation 3}$$
$$\frac{1}{2}\log\left(1 + \frac{P_{e,1}}{\sigma_q^2 + \beta_q(P_{e,2} + P_{b,2})}\right)\text{ bps/Hz}$$

For typical interference conditions, it can be shown that the above rates for the base and enhancement streams are larger than those with no reuse for the base (i.e. all 2N tones used for both base and enhancement) as well as those with a reuse factor of two (i.e. only N tones used for base and enhancement at each transmitter).

Generally, the service provider maps out the physical location of the AP. Thereafter, several AP are identified as likely to have the coverage hole, discussed above. For these AP, the tones used for carrying out the disclosed implementation may be pre-selected, modified over the air, or dynamically controlled the access controller.

Figure 4:
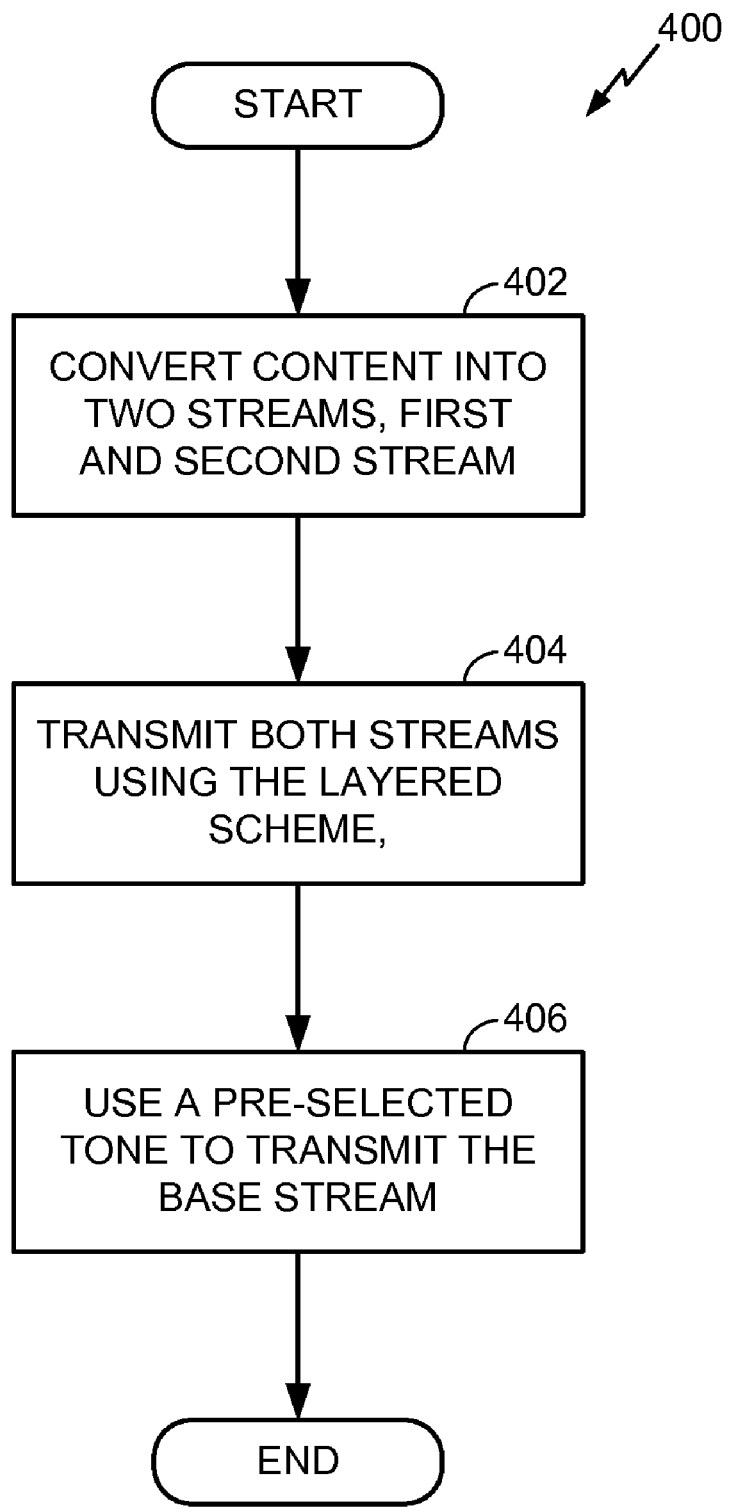
FIG. 4 illustrates a process for broadcasting content using two streams.

FIG. 4 illustrates a process 400, for broadcasting content using two streams. The AP 102x is configured to execute steps of the process 400 by utilizing at least one of various components described in FIG. 2 for example, the controller 220, the scheduler 230, the memory 222, the TX data processor 214, RX data processor 234, etc. In an embodiment, AP 102x is pre-selected to utilize the techniques discussed above. At step 402, AP 102x converts the content into two streams, a first stream (i.e., enhanced stream) and a second stream (i.e. base stream). The streams may be series of data packet of the content. The enhanced stream is modulated to provided additional data rate in a smaller coverage area than the base stream. At step 404, the AP 102x transmits both streams using the layered scheme, discussed above. At step 406, the AP 102x, uses a pre-selected tone to transmit the base stream. The frequency of pre-selected tone is orthogonal to the frequency of tone used by one or more of the adjacent AP 102x. In an alternate embodiment the same frequency may used for transmitting the base stream, wherein the time (symbol) of transmission is orthogonal to the adjacent AP 102x.

The techniques described herein may be implemented by various means. For example, these techniques may be implemented in hardware, software, or a combination thereof. For a hardware implementation, the processing units (e.g., controllers 220 and 270, TX and RX processors 214 and 234, and so on) for these techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in memory units (e.g., memory 222 in FIG. 2) and executed by processors (e.g., controllers 220). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of broadcasting a content in a wireless communication system, said method comprising acts of:
    converting the content into a first stream and a second stream;
    allocating a first set of tones and a second set of tones to a first access point, wherein the first set of tones has a coverage smaller than a coverage of the second set of tones;
    transmitting from the first access point said first stream using the first set of tones; and
    transmitting from the first access point said second stream using the second set of tones.

2. The method as claimed in claim 1, wherein said second set of tones is orthogonal to a tone used by a second access point adjacent to the first access point.

3. The method as claimed in claim 1, further comprising an act of transmitting said first stream using second set of tones along with said second stream.

4. The method as claimed in claim 3, further comprising an act of layering said first stream and said second stream on said first tone.

5. The method as claimed in claim 1, wherein
    said act of transmitting said first stream comprises act of transmitting said first stream at a first data rate; and
    said act of transmitting said second stream comprises act of transmitting said second stream at a second data rate different from said first data rate.

6. The method as claimed in claim 5, wherein
    said second data rate is lower than said first data rate.

7. The method as claimed in claim 1, further comprising an act of transmitting said second stream using a power level for said second stream that is different from a power level used for first stream.

8. The method as claimed in claim 1, wherein the said of transmitting further comprising act of transmitting in accordance with a Code Division Multiplex Access (CDMA) scheme.

9. The method as claimed in claim 1, wherein the said of transmitting further comprising act of transmitting in accordance with an Orthogonal Frequency Division Multiplex (OFDM) scheme.

10. The method as claimed in claim 1, wherein said act of transmitting further comprising act of transmitting in accordance with an Orthogonal Frequency Division Multiple Access (OFDMA) scheme.

11. An apparatus for broadcasting a content in a wireless communication system, said apparatus comprising:
    means for converting the content into a first stream and a second stream;
    means for allocating a first set of tones and a second set of tones to a first access point, wherein the first set of tones has a coverage smaller than a coverage of the second set of tones;
    means for transmitting from the first access point said first stream using the first set of tones; and
    means for transmitting from the first access point said second stream using the second set of tones.

12. The apparatus as claimed in claim 11, wherein said second set of tones is orthogonal to a tone used by a second access point adjacent to the first access point.

13. The apparatus as claimed in claim 11, further comprising means for transmitting said first stream using said second set of tones along with said second stream.

14. The apparatus as claimed in claim 13, further comprising an means for layering said first stream and said second stream on said first tone.

15. The apparatus as claimed in claim 11, wherein
    said means for transmitting said first stream comprises means for transmitting said first stream at a first data rate; and
    said means for transmitting said second stream comprises means for transmitting said second stream at a second data rate different from the first data rate.

16. The apparatus as claimed in claim 15, wherein
    said second data rate is lower that said first data rate.

17. The apparatus as claimed in claim 11, further comprising means for using a power level for transmitting said second stream that is different from a power level used for first stream.

18. The apparatus as claimed in claim 11, wherein the said of transmitting further comprising means for transmitting in accordance with a Code Division Multiplex Access (CDMA) scheme.

19. The apparatus as claimed in claim 11, wherein the said of transmitting further comprising means for transmitting in accordance with an Orthogonal Frequency Division Multiplex (OFDM) scheme.

20. The apparatus as claimed in claim 11, wherein said means for transmitting further comprising means for transmitting in accordance with an Orthogonal Frequency Division Multiple Access (OFDMA) scheme.

21. In a wireless communication system, an apparatus comprising:
    an electronic device, said electronic device configured to convert a received content into a first stream and a second stream, configured to allocating a first set of tones and a second set of tones to a first access point, wherein the first set of tones has a coverage smaller than a coverage of the second set of tones, configured to transmit said first stream using said first set of tones and configured to transmit said second stream using the second set of tones.

22. The apparatus as claimed in claim 21, wherein said second set of tones is orthogonal to a tone used by a second access point adjacent to the first access point.

23. The apparatus as claimed in claim 21, said electronic device further configured to transmit said first stream using said second set of tones along with said second stream.

24. The apparatus as claimed in claim 23, said electronic device is further configured to layer said first stream and said second stream on said first tone.

25. The apparatus as claimed in claim 21, wherein
    said electronic device is further configured to transmit said first stream at a first data rate; and
    said electronic device is further configured to transmit said second stream at a second data rate different from the first data rate.

26. The apparatus as claimed in claim 25, wherein said first data rate said is faster than said second data rate.

27. The apparatus as claimed in claim 21, said electronic device is further configured to use a power level that is different from a power level used for first stream.

28. A machine-readable medium comprising instructions which, when executed by a machine, cause the machine to perform operations including:
- converting the content into a first stream and a second stream;
- allocating a first set of tones and a second set of tones to an access point, wherein the first set of tones has a coverage smaller than a coverage of the second set of tones;
- transmitting said first stream using the first set of tones; and
- transmitting said second stream using the second set of tones.

29. The machine-readable medium a claimed in claim 28, wherein said second set of tones is orthogonal to a tone used by a second access point adjacent to the first access point.

30. A broadcast system, said system comprising:
- a first access point and an adjacent access point;
- said first access point configured to convert a content into a first stream and a second stream;
- transmit said first stream using a first set of tones allocated thereto the first access point; and
- transmit said second stream using a second set of tones allocated to the first access point, wherein the first set of tones has a coverage smaller than a coverage of the second set of tones.

31. The broadcast system as claimed in claim 30, wherein said second set of tones is orthogonal to a tone used by said adjacent access point.

* * * * *